United States Patent
Du et al.

(10) Patent No.: US 10,621,088 B2
(45) Date of Patent: Apr. 14, 2020

(54) APPARATUS AND METHOD TO IMPROVE MEMORY ACCESS PERFORMANCE BETWEEN SHARED LOCAL MEMORY AND SYSTEM GLOBAL MEMORY

(71) Applicant: Intel Corporation, Santa Clara, CA (US)

(72) Inventors: Jianghong Du, Shanghai (CN); Yong Jiang, Shanghai (CN); Lei Shen, Shanghai (CN); Yuanyuan Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/525,033

(22) PCT Filed: Dec. 8, 2014

(86) PCT No.: PCT/CN2014/093297
§ 371 (c)(1),
(2) Date: May 5, 2017

(87) PCT Pub. No.: WO2016/090536
PCT Pub. Date: Jun. 16, 2016

(65) Prior Publication Data
US 2017/0364440 A1   Dec. 21, 2017

(51) Int. Cl.
*G06F 12/08* (2016.01)
*G06F 12/02* (2006.01)
*G06F 12/0804* (2016.01)

(52) U.S. Cl.
CPC ........ *G06F 12/0804* (2013.01); *G06F 12/023* (2013.01); *G06F 12/0284* (2013.01); *G06F 2212/1024* (2013.01); *G06F 2212/302* (2013.01)

(58) Field of Classification Search
CPC ........ G06F 12/0804; G06F 2212/1024; G06F 2212/302; G06F 9/5044; G06F 9/5016; G06T 1/20; G06T 1/60
See application file for complete search history.

(56) References Cited

U.S. PATENT DOCUMENTS

| | | | |
|---|---|---|---|
| 9,092,267 | B2 | 7/2015 | Arvo |
| 2005/0108532 | A1 | 5/2005 | Bajikar |

(Continued)

FOREIGN PATENT DOCUMENTS

| | | |
|---|---|---|
| CN | 102707986 | 10/2012 |
| CN | 103164657 | 6/2013 |
| CN | 103608777 | 2/2014 |

OTHER PUBLICATIONS

Tompson, "An Introduction to the OpenCL Programming Model," NYU: Media Research Lab, published in Journal—Person Education, vol. 49, May 16, 2012, 8 pages.*

(Continued)

*Primary Examiner* — Glenn Gossage
(74) *Attorney, Agent, or Firm* — Green, Howard & Mughal LLP

(57) ABSTRACT

An apparatus, method and machine-readable storage medium to improve memory access performance between shared local memory and system global memory are described. The method comprises grouping two or more work groups to form a super workgroup, and positioning a portion of a memory space into one or more super shared local memories (Super SLMs), wherein the memory space which is shared within the super workgroup forms at least one Super SLM of the one or more Super SLMs. The apparatus comprises: a plurality of execution units; a cache memory having a portion which operates as a shared local memory (SLM), which is shared with the plurality of execution units, at least one of which operates on a work (Continued)

group of a sub-slice, wherein the SLM is shared within the work group; and at least one Super-SLM for providing shared memory accessible by different work groups in the sub-slice, wherein the at least one of the execution units operates on the different work groups. A last work group may write data back to a system global memory (SGM) from a Super-SLM.

21 Claims, 14 Drawing Sheets

(56) References Cited

U.S. PATENT DOCUMENTS

| | | |
|---|---|---|
| 2005/0138386 A1 | 6/2005 | Le Saint |
| 2012/0084517 A1 | 4/2012 | Post et al. |
| 2012/0169747 A1* | 7/2012 | Kaburlasos .............. G06T 1/20 |
| | | 345/522 |
| 2013/0024667 A1* | 1/2013 | Kyo ........................ G06F 8/423 |
| | | 712/221 |
| 2013/0054978 A1 | 2/2013 | Yun et al. |
| 2013/0332666 A1* | 12/2013 | Haruki ................. G11C 7/1075 |
| | | 711/104 |
| 2014/0095912 A1* | 4/2014 | Hurd ..................... G06F 1/3234 |
| | | 713/323 |
| 2015/0347105 A1* | 12/2015 | Avkarogullari ....... G06F 8/4441 |
| | | 717/154 |
| 2019/0259129 A1* | 8/2019 | Rao et al. |

OTHER PUBLICATIONS

OpenCL BOF, Khronos Group, SIGGRAPH 2013, Jul. 2013, pp. 1-39.*

The Compute Architecture of Intel Processor Graphics Gen7.5, Version 1.0, Aug. 1, 2014, 16 pages.*

International Search Report and Written Opinion for International Application No. PCT/CN2014/093297 dated Sep. 14, 2015, 11 pages.

International Preliminary Report on Patentability for International Patent Application No. PCT/CN2014/093297, dated Jun. 22, 2017.

* cited by examiner

APPARATUS AND METHOD TO IMPROVE MEMORY ACCESS PERFORMANCE BETWEEN SHARED LOCAL MEMORY AND SYSTEM GLOBAL MEMORY

CLAIM OF PRIORITY

This application is a National Phase Application of, and claims priority to, PCT Application No. PCT/CN2014/093297, filed on 8 Dec. 2014, titled "APPARATUS AND METHOD TO IMPROVE MEMORY ACCESS PERFORMANCE BETWEEN SHARED LOCAL MEMORY AND SYSTEM GLOBAL MEMORY," which is incorporated by reference in its entirety for all purposes.

BACKGROUND

Open Computing Language (OpenCL) is a framework supported by the Khronos Group (accessible at khronos.org) for writing programs that execute across heterogeneous platforms including graphics processing units (GPUs) and other processors. In OpenCL and other related heterogeneous computing frameworks, Shared Local Memory (SLM) is a portion of Level-3 cache which is dedicated to Execution Units (EUs) as local memory. SLM is used and shared by different work items within one work group.

However, in some cases, there are many operations related to memory writing and reading between SLM and a System Global Memory (SGM). For example, operations such as generating histograms have large numbers of work groups. In such cases, writing data from SLM to SGM takes long.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
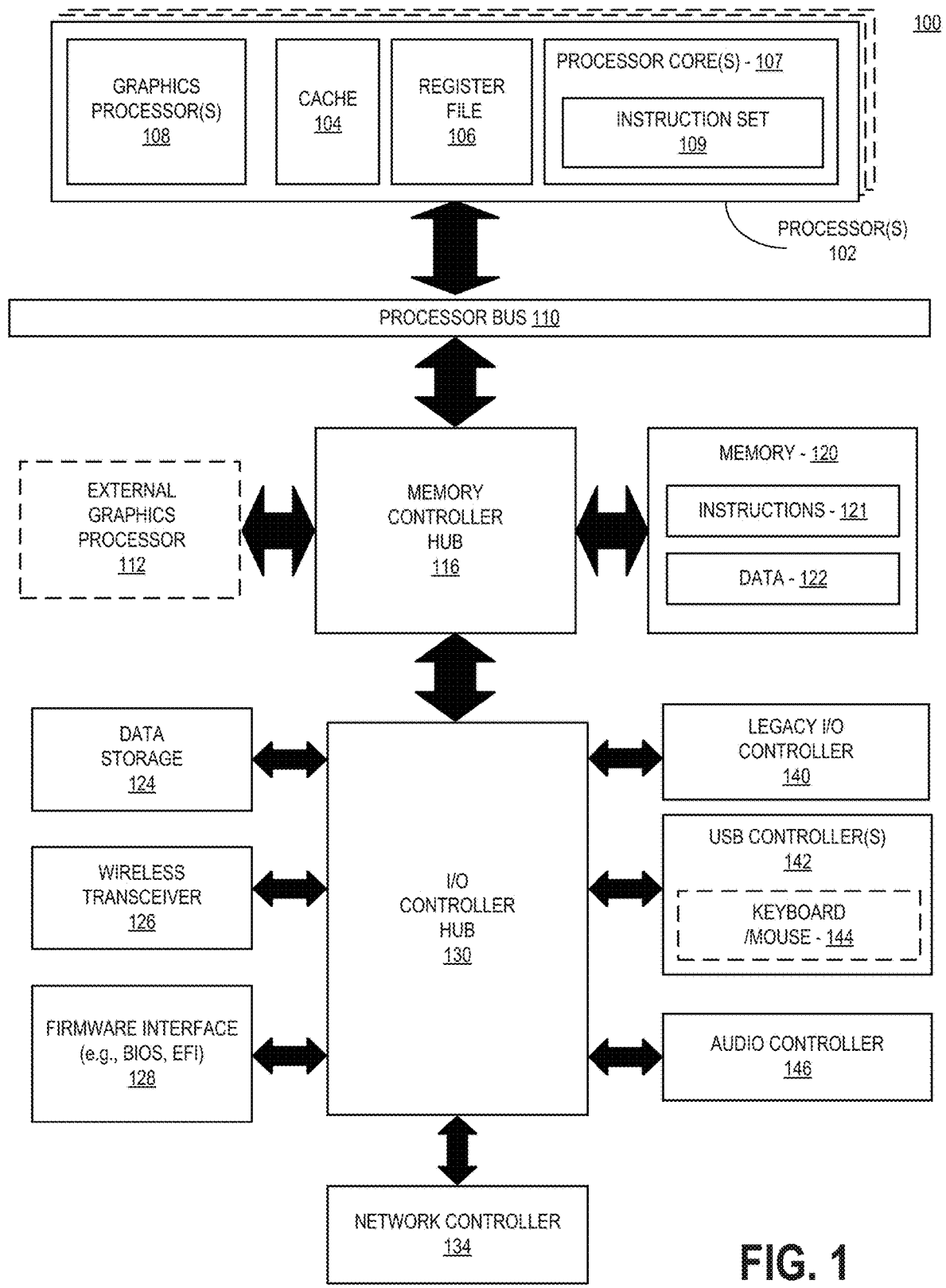
FIG. 1 illustrates a block diagram of a data processing system to improve memory access performance between Shared Local Memory (SLM) and System Global Memory (SGM), according to some embodiments of the disclosure.

Performance is improved between Shared Local Memory (SLM) and System Global Memory (SGM) by forming a new memory partition (logical or physical) that can be shared between some workgroups, in accordance with some embodiments.

In some embodiments, a Super-Workgroup is defined on top of a workgroup. Here, the term "Super-Workgroup" generally refers to grouping of different work groups on the same sub-slice. Super-Workgroup is described with reference to Super-SLM. Here, the term "Super-SLM" generally refers to a logical or physical SLM that can be logically or physically shared by the workgroups under the Super-Workgroup.

In some embodiments, data is written from Super-SLM to the SGM instead of from traditional SLM to the SGM. In such embodiments, the number of memory writing operations are reduced from cache (e.g., Level-3 cache having the Super-SLM and SLM) to SGM. Reducing the number of memory writing operations may improve the calculation performance and improve power performance of the computing system having the SGM and Super-SLM.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal or data/clock signal. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits, modules, and logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET source and drain terminals are symmetrical i.e., are identical terminals, and are interchangeably used here.

A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure.

FIG. 1 illustrates a block diagram of a data processing system 100, according to some embodiments. Data processing system 100 includes one or more processors 102 and one or more graphics processors 108, and may be a single processor desktop system, a multiprocessor workstation system, or a server system having a large number of processors 102 or processor cores 107. In some embodiments, data processing system 100 is a system on a chip (SOC) integrated circuit for use in mobile, handheld, or embedded devices.

An embodiment of data processing system 100 can include, or be incorporated within a server-based gaming platform, a game console, including a game and media console, a mobile gaming console, a handheld game console, or an online game console. In some embodiments, data processing system is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, one or more processors 102 each include one or more processor cores 107 to process instructions which, when executed, perform operations for system and user software. In some embodiments, each of the one or more processor cores 107 is configured to process a specific instruction set 109. The instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109 which may include instructions to facilitate the emulation of other instruction sets. Processor core 107 may also include other processing devices, such a Digital Signal Processor (DSP).

In some embodiments, processor 102 includes cache memory 104. Depending on the architecture, processor 102 can have a single internal cache or multiple levels of internal cache. In some embodiments, the cache memory is shared among various components of processor 102. In some embodiments, processor 102 also uses an external cache (e.g., a Level-3 (L3) cache or Last Level Cache (LLC)) (not shown) which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of processor 102.

In some embodiments, processor 102 is coupled to processor bus 110 to transmit data signals between processor 102 and other components in system 100. System 100 uses an exemplary 'hub' system architecture, including a memory controller hub (MCH) 116 and an input output (I/O) controller hub 130. Memory controller hub 116 facilitates communication between a memory device and other components of the system 100, while I/O Controller Hub (ICH) 130 provides connections to I/O devices via a local I/O bus.

In some embodiments, memory device 120, can be a Dynamic Random Access Memory (DRAM) device, a Static Random Access Memory (SRAM) device, flash memory device, or some other memory device having suitable performance to serve as process memory. Memory 120 can store data 122 and instructions 121 for use when processor 102 executes a process. Memory controller hub 116 also couples with an optional external graphics processor 112, which may communicate with one or more graphics processors 108 in processor 102 to perform graphics and media operations.

The ICH 130 enables peripherals to connect to the memory 120 and processor 102 via a high-speed I/O bus. The I/O peripherals include an audio controller 146, a firmware interface 128 (e.g., BIOS, EFI), a wireless transceiver 126 (e.g., Wi-Fi, BLUETOOTH), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse combinations 144.

A network controller 134 may also couple to ICH 130. In some embodiments, a high-performance network controller (not shown) couples to processor bus 110.

Figure 2:
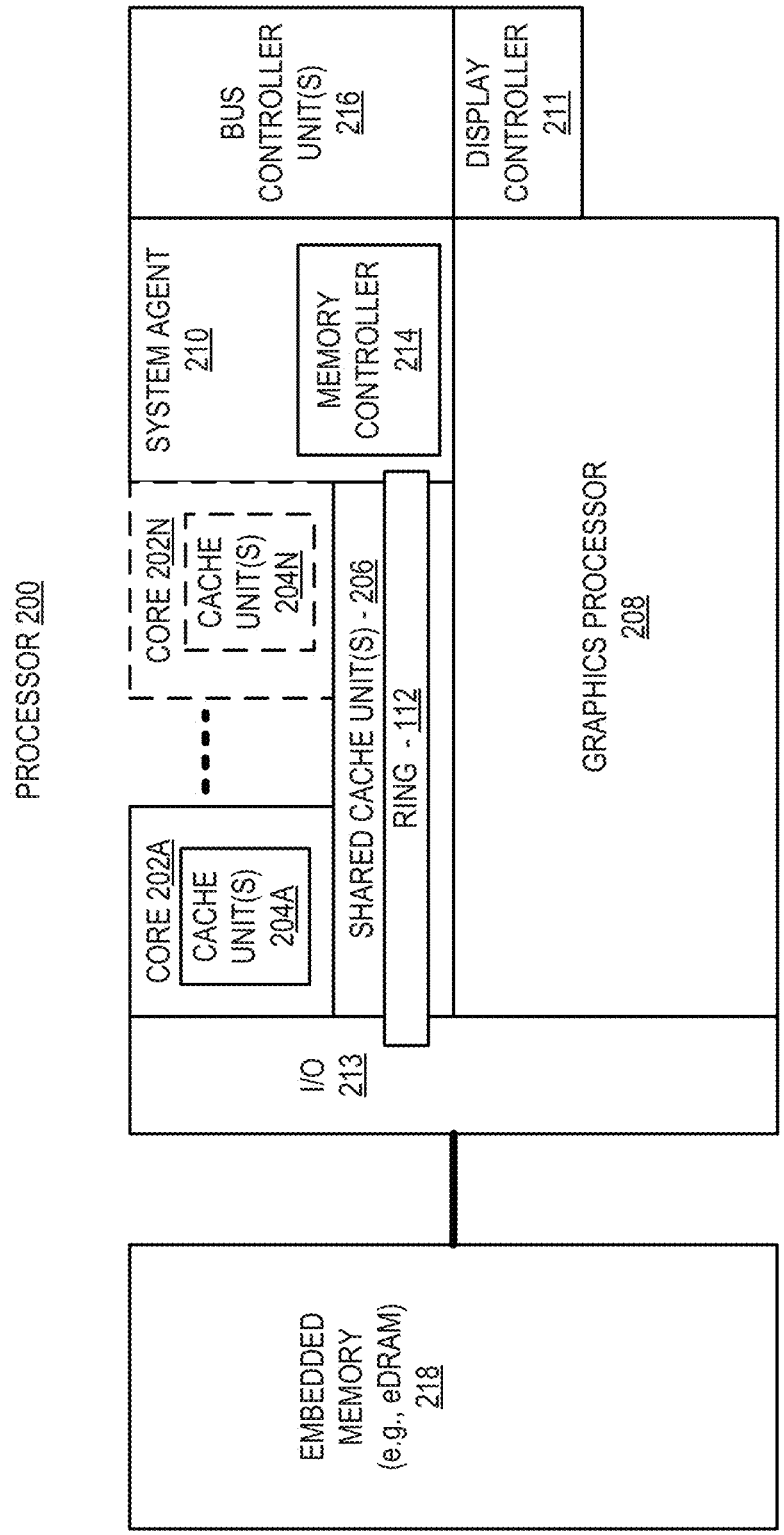
FIG. 2 illustrates a block diagram of a processor having one or more processor cores, an integrated memory controller, and an integrated graphics processor, to improve memory access performance between SLM and SGM, according to some embodiments of the disclosure.

FIG. 2 illustrates a block diagram of an embodiment of processor 200 having one or more processor cores 202A-N, integrated memory controller 214, and integrated graphics processor 208. It is pointed out that those elements of FIG. 2 having the same reference numbers (or names) as the elements of any other figure can operate or function in any manner similar to that described, but are not limited to such.

Processor 200 can include additional cores up to and including additional core 202N represented by the dashed lined boxes. Each of the cores 202A-N includes one or more internal cache units 204A-N. In some embodiments, each core also has access to one or more shared cached units 206.

In some embodiments, internal cache units 204A-N and shared cache units 206 represent a cache memory hierarchy within processor 200.

The cache memory hierarchy may include at least one level of instruction and data cache within each core and one or more levels of shared mid-level cache, such as a Level-2 (L2), Level-3 (L3), Level-4 (L4), or other levels of cache, where the highest level of cache before external memory is classified as the last level cache (LLC). In some embodiments, cache coherency logic maintains coherency between the various cache units 206 and 204A-N.

In some embodiments, processor 200 may also include a set of one or more bus controller units 216 and system agent 210. The one or more bus controller units manage a set of peripheral buses, such as one or more Peripheral Component Interconnect buses (e.g., PCI, PCI Express). In some embodiments, system agent 210 provides management functionality for the various processor components. In some embodiments, system agent 210 includes one or more integrated memory controllers 214 to manage access to various external memory devices (not shown).

In some embodiments, one or more of the cores 202A-N includes support for simultaneous multi-threading. In such embodiments, system agent 210 includes components for coordinating and operating cores 202A-N during multi-threaded processing. In some embodiments, system agent 210 may additionally include a power control unit (PCU), which includes logic and components to regulate the power state of the cores 202A-N and graphics processor 208.

In some embodiments, processor 200 additionally includes a graphics processor 208 to execute graphics processing operations. In some embodiments, graphics processor 208 couples with the set of shared cache units 206, and system agent unit 210, including one or more integrated memory controllers 214. In some embodiments, display controller 211 is coupled with graphics processor 208 to drive graphics processor output to one or more coupled displays.

In some embodiments, display controller 211 may be a separate module coupled with the graphics processor via at least one interconnect, or may be integrated within the graphics processor 208 or system agent 210.

In some embodiments, a ring based interconnect unit 212 is used to couple the internal components of processor 200, however an alternative interconnect unit may be used, such as a point to point interconnect, a switched interconnect, or other techniques, including techniques well known in the art. In some embodiments, graphics processor 208 couples with ring interconnect 212 via I/O link 213.

The example I/O link 213 represents at least one of multiple varieties of I/O interconnects, including an on package I/O interconnect which facilitates communication between various processor components and a high-performance embedded memory module 218, such as an eDRAM module. In some embodiments, each of cores 202-N and graphics processor 208 use embedded memory modules 218 as shared last level cache.

In some embodiments, cores 202A-N are homogenous cores executing the same instruction set architecture. In another embodiment, cores 202A-N are heterogeneous in terms of instruction set architecture (ISA), where one or more of cores 202A-N execute a first instruction set, while at least one of the other cores executes a subset of the first instruction set or a different instruction set.

In some embodiments, processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor (NMOS) logic. Additionally, processor 200 can be implemented on one or more chips or as a system on a chip (SOC) integrated circuit having the illustrated components, in addition to other components.

Figure 3:
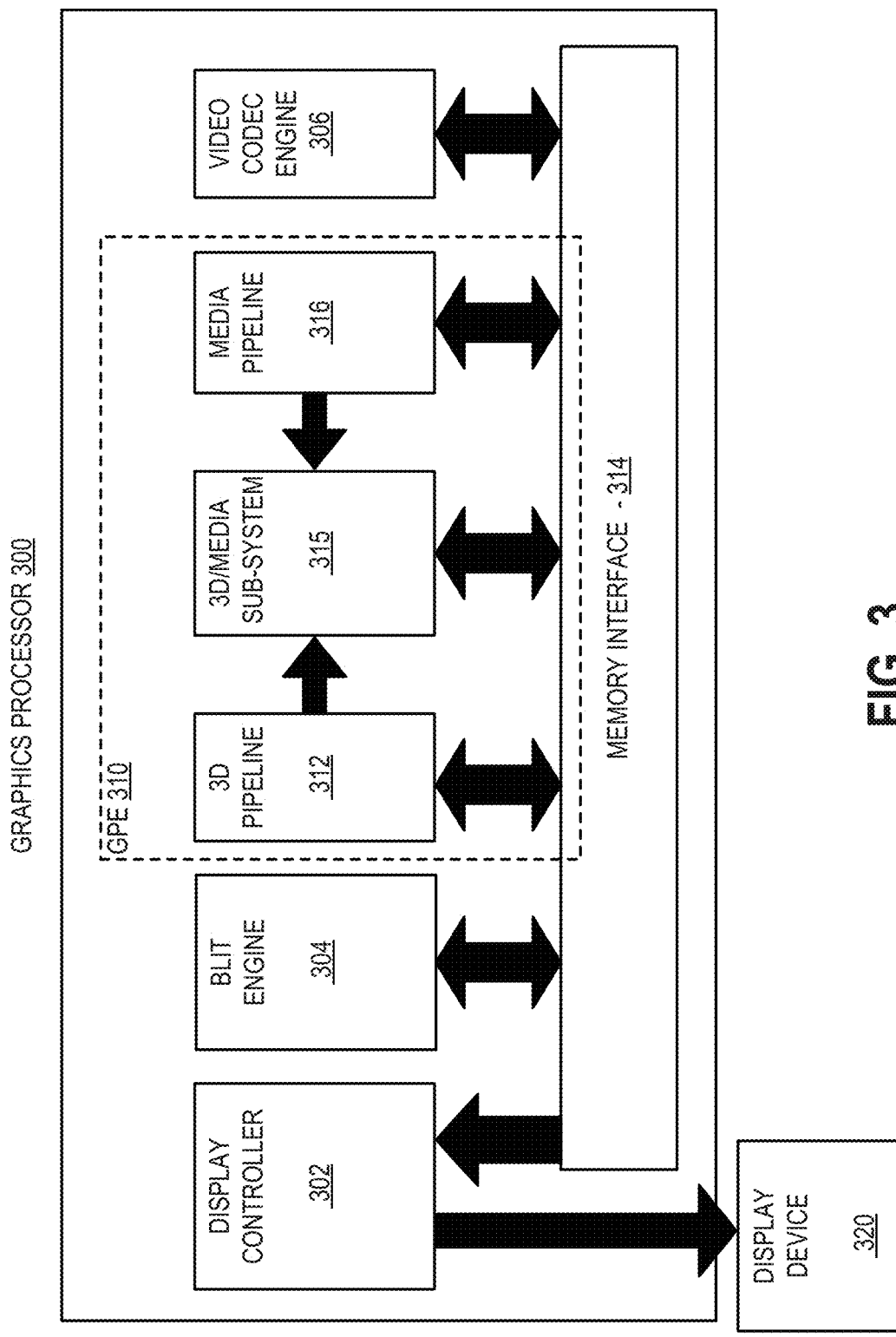
FIG. 3 illustrates a block diagram of a graphics processor which may be a discreet graphics processing unit, or may be graphics processor integrated with a plurality of processing cores, according to some embodiments of the disclosure.

FIG. 3 illustrates a block diagram of one embodiment of a graphics processor 300 which may be a discrete graphics processing unit, or may be graphics processor integrated with a plurality of processing cores. It is pointed out that those elements of FIG. 3 having the same reference numbers (or names) as the elements of any other figure can operate or function in any manner similar to that described, but are not limited to such.

In some embodiments, the graphics processor is communicated with via a memory mapped I/O interface to registers on the graphics processor and via commands placed into the processor memory. In some embodiments, graphics processor 300 includes a memory interface 314 to access memory. In some embodiments, memory interface 314 can be an interface to local memory, one or more internal caches, one or more shared external caches, and/or to system memory.

In some embodiments, graphics processor 300 also includes a display controller 302 to drive display output data to a display device 320. In some embodiments, display controller 302 includes hardware for one or more overlay planes for the display and composition of multiple layers of video or user interface elements. In some embodiments, graphics processor 300 includes video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. In some embodiments, 2D graphics operations are performed using one or more components of the graphics-processing engine (GPE) 310. In some embodiments, GPE 310 is a compute engine for performing graphics operations, including three-dimensional (3D) graphics operations and media operations, etc.

In some embodiments, GPE 310 includes a 3D pipeline 312 for performing 3D operations, such as rendering three-dimensional images and scenes using processing functions that act upon 3D primitive shapes (e.g., rectangle, triangle, etc.). In some embodiments, 3D pipeline 312 includes programmable and fixed function elements that perform various tasks within the element and/or spawn execution threads to 3D/Media sub-system 315. While 3D pipeline 312 can be used to perform media operations, an embodiment of GPE 310 also includes media pipeline 316 that is specifically used to perform media operations, such as video post processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306.

In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In some embodiments, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Figure 4:
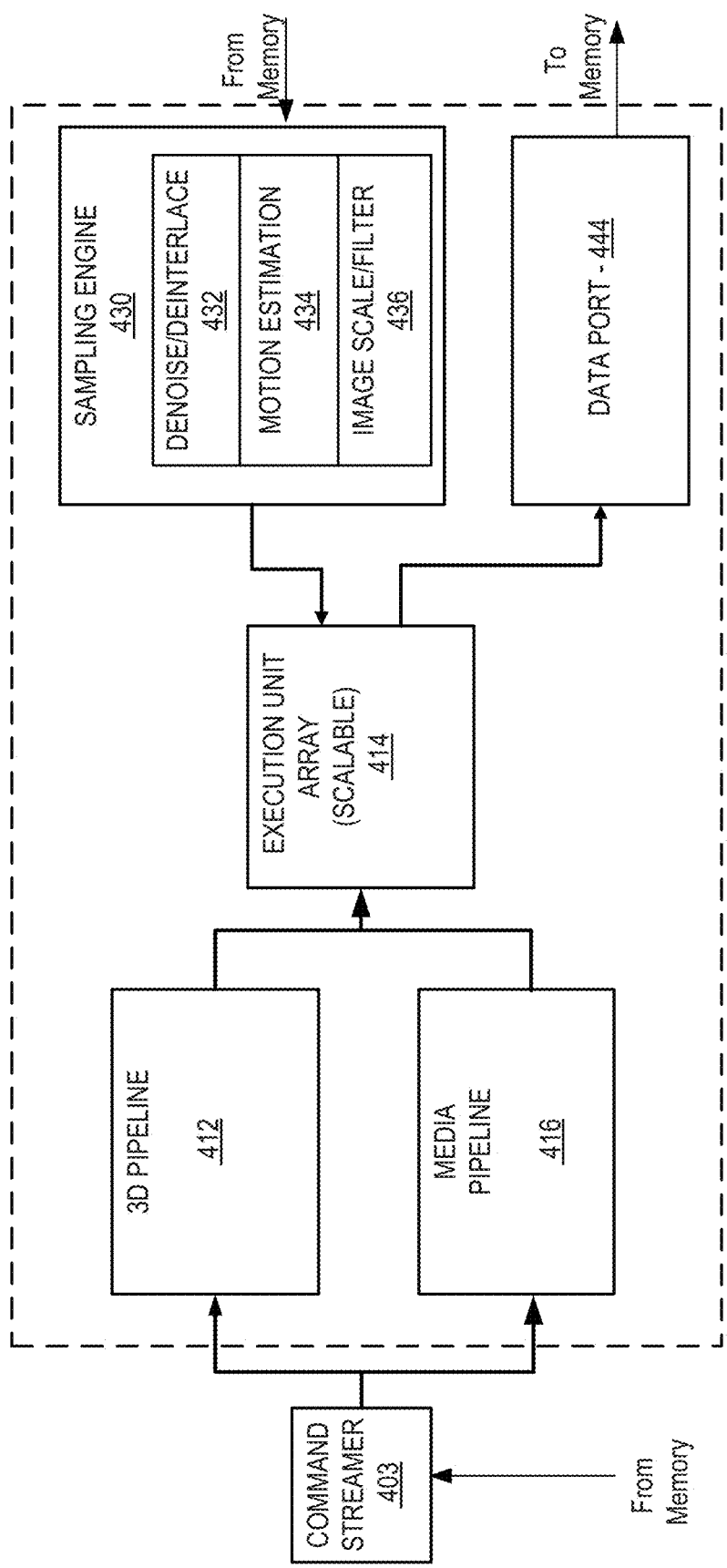
FIG. 4 illustrates a block diagram of a graphics processing engine (GPE) for a graphics processor, according to some embodiments of the disclosure.

FIG. 4 illustrates a block diagram of an embodiment of GPE 410 for a graphics processor. It is pointed out that those elements of FIG. 4 having the same reference numbers (or names) as the elements of any other figure can operate or function in any manner similar to that described, but are not limited to such.

In some embodiments, GPE 410 is a version of the GPE 310 described with reference to FIG. 3. Referring back to FIG. 4, in some embodiments, GPE 410 includes 3D pipeline 412 and media pipeline 416, each of which can be either different from or similar to the implementations of 3D pipeline 312 and media pipeline 316 of FIG. 3.

Referring back to FIG. 4, in some embodiments, GPE 410 couples with command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The 3D and media pipelines process the commands by performing operations via logic within the respective pipelines or by dispatching one or more execution threads to execution unit array 414. In some embodiments, execution unit array 414 is scalable, such that the array includes a variable number of execution units based on the target power and performance level of GPE 410.

In some embodiments, sampling engine 430 couples with memory (e.g., cache memory or system memory) and execution unit array 414. In some embodiments, sampling engine 430 provides a memory access mechanism for scalable execution unit array 414 that allows execution unit array 414 to read graphics and media data from memory. In some embodiments, sampling engine 430 includes logic to perform specialized image sampling operations for media.

In some embodiments, the specialized media sampling logic in sampling engine 430 includes de-noise/de-interlace module 432, motion estimation module 434, and image scaling and filtering module 436. In some embodiments, de-noise/de-interlace module 432 includes logic to perform one or more of de-noise or de-interlace algorithms on the decoded video data. The de-interlace logic combines alternating fields of interlaced video content into a single frame of video. The de-noise logic reduces or removes data noise from the video and image data. In some embodiments, the de-noise logic and de-interlace logic are motion adaptive and use spatial or temporal filtering based on the amount of motion detected in the video data. In some embodiments, de-noise/de-interlace module 432 includes dedicated motion detection logic (e.g., within motion estimation module 434).

In some embodiments, motion estimation module 434 provides hardware acceleration for video operations by performing video acceleration functions such as motion vector estimation and prediction on video data. The motion estimation module 434 determines motion vectors that describe the transformation of image data between successive video frames.

In some embodiments, a graphics processor media codec uses the video motion estimation module 434 to perform operations on the video at the macro-block level that may otherwise be computationally intensive to perform using a general-purpose processor. In some embodiments, motion estimation module 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, GPE 410 includes data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Figure 5:
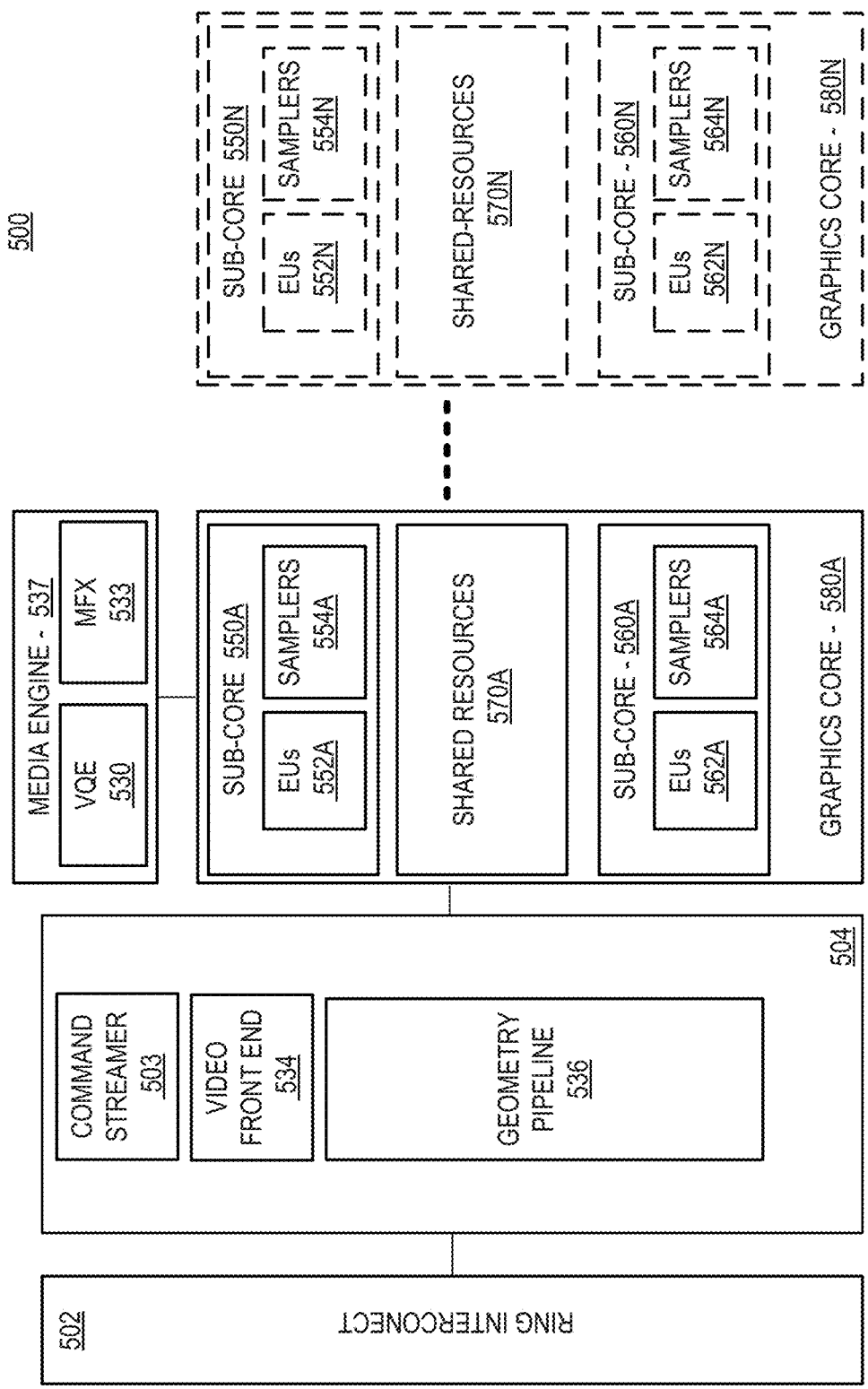
FIG. 5 illustrates a block diagram of another embodiment of a graphics processor related to an execution unit.

FIG. 5 illustrates a block diagram 500 of another embodiment of a graphics processor related to an execution unit. It is pointed out that those elements of FIG. 5 having the same reference numbers (or names) as the elements of any other figure can operate or function in any manner similar to that described, but are not limited to such.

In some embodiments, the graphics processor includes ring interconnect 502, pipeline front-end 504, media engine 537, and graphics cores 580A-N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor receives batches of commands via ring interconnect 502. The incoming commands are interpreted by command streamer 503 in the pipeline front-end 504. The graphics processor includes scalable execution logic to perform 3D geometry processing and media processing via graphics core(s) 580A-N. For 3D geometry processing commands, command streamer 503 supplies the commands to geometry pipeline 536. For at least some media processing commands, command streamer 503 supplies the commands to video front end 534, which couples with media engine 537. In some embodiments, media engine 537 includes a Video Quality Engine (VQE)

530 for video and image post processing and multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In some embodiments, the graphics processor includes graphics core 580A having at least first sub-core 550A and second core sub-core 560A. In another embodiment, the graphics processor is a low power processor with a single sub-core (e.g., 550A). In some embodiments, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In some embodiments, each sub-core 550A-N, 560A-N shares a set of shared resources 570A-N. In some embodiments, the shared resources include shared cache memory and pixel operation logic. Other shared resources may also be included in the various embodiments of the graphics processor.

Figure 6:
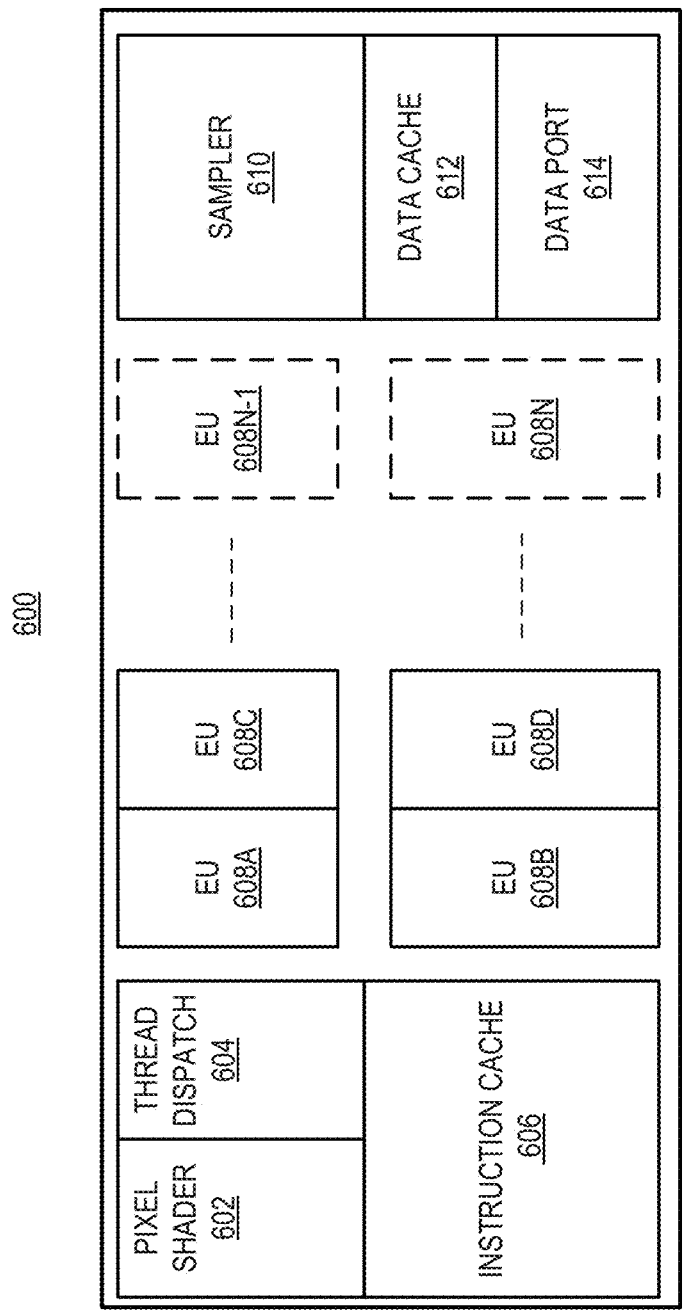
FIG. 6 illustrates thread execution logic including an array of processing elements employed in some embodiments of a GPE.

FIG. 6 illustrates thread execution logic 600 including an array of processing elements employed in one embodiment of a graphics processing engine. It is pointed out that those elements of FIG. 6 having the same reference numbers (or names) as the elements of any other figure can operate or function in any manner similar to that described, but are not limited to such.

In some embodiments, thread execution logic 600 includes pixel shader 602, thread dispatcher 604, instruction cache 606, scalable execution unit array including a plurality of execution units 608A-N, sampler 610, data cache 612, and data port 614. In some embodiments, the included components are interconnected via an interconnect fabric that links to each of the components. In some embodiments, thread execution logic 600 includes one or more connections to memory, such as system memory or cache memory, through one or more of instruction cache 606, data port 614, sampler 610, and the execution unit array includes execution units 608A-N. In some embodiments, each execution unit (e.g. 608A) is an individual vector processor capable of executing multiple simultaneous threads and processing multiple data elements in parallel for each thread In some embodiments, the execution unit array includes any number of individual execution units 608A-N.

In some embodiments, the execution unit array is primarily used to execute "shader" programs. In some embodiments, the execution units in the array execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to thread execution logic 600. Referring back to FIG. 6, in some embodiments, thread dispatcher 604 can also process runtime thread spawning requests from the executing shader programs.

Once a group of geometric objects have been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API) supplied pixel shader program. To execute the pixel shader program, pixel shader 602 dispatches threads to an execution unit (e.g., 608A) via the thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, data port 614 provides a memory access mechanism for thread execution logic 600 output processed data to memory for processing on a graphics processor output pipeline. In some embodiments, data port 614 includes or couples to one or more cache memories (e.g., data cache 612) to cache data for memory access via the data port.

Figure 7:
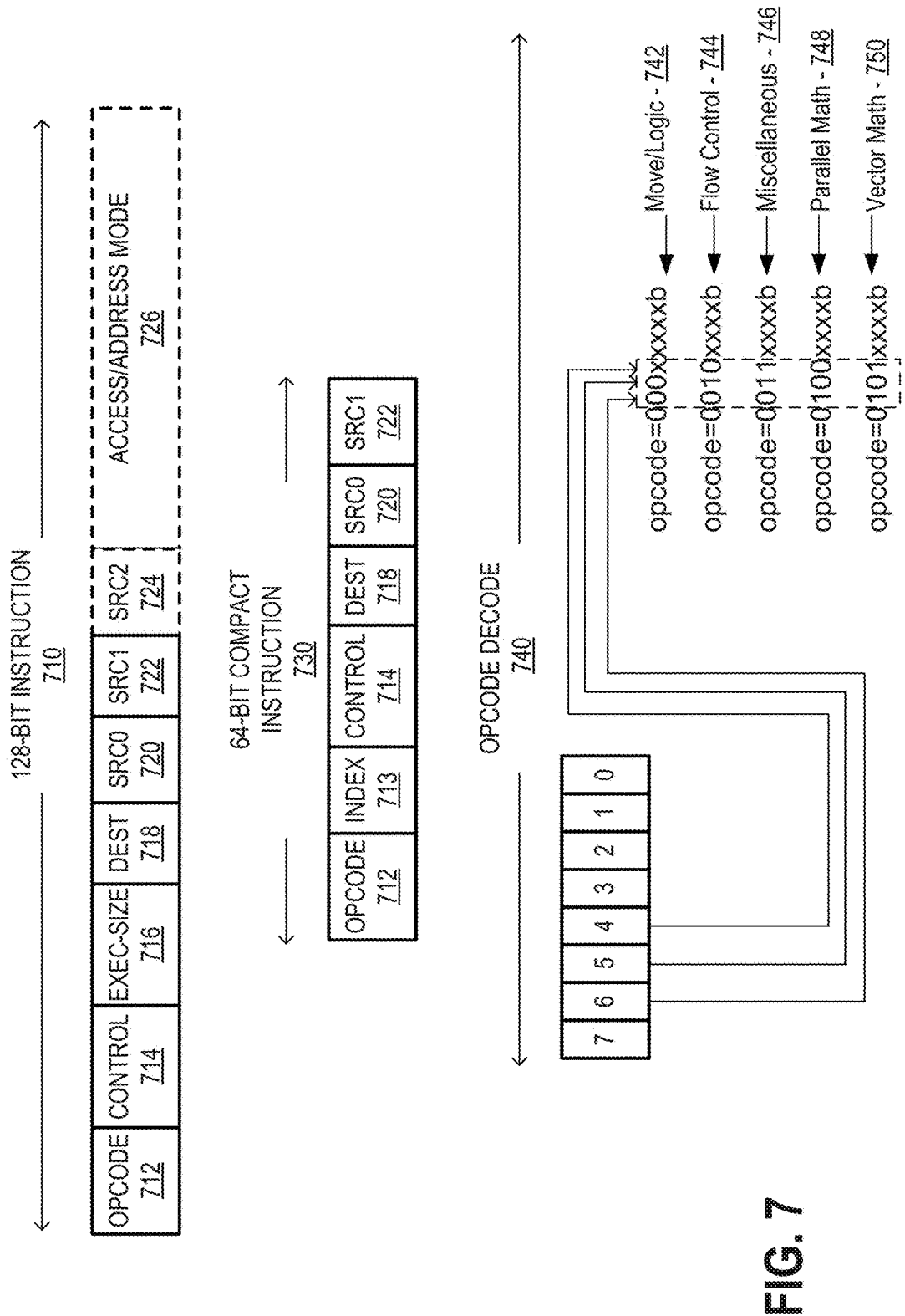
FIG. 7 illustrates a block diagram illustrating a graphics processor execution unit instruction format, according to some embodiments of the disclosure.

FIG. 7 illustrates a block diagram illustrating a graphics processor execution unit instruction format 700, according to some embodiments of the disclosure. In some embodiments, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format 700 described as illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction, the execution unit performs a simultaneous add operation across each color channel representing a texture element or picture element. By default, the execution unit performs each instruction across all data channels of the operands. In some embodiments, instruction control field 712 enables control over certain execution options, such as channels selection (e.g., predication) and data channel order (e.g., swizzle). For 128-bit instruction format 710, an exec-size field 716 limits the number of data channels that will be executed in parallel. In some embodiments, exec-size field 716 is not available for use in the 64-bit compact instruction format 730.

Some execution unit instructions have up to three operands including two source (src) operands, src0 722, src1 722, and one destination operand 718. In some embodiments, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In some embodiments, instructions are grouped based on opcode bit-fields to simplify Opcode decode 740. For an 8-bit opcode, bits 4, 5, and 6 allow the execution unit to determine the type of opcode. The precise opcode grouping shown is just an example. In some embodiments, move and logic opcode or instruction group 742 includes data movement and logic instructions (e.g., move (mov), compare (cmp)). In some embodiments, move and logic instruction group 742 shares the five most significant bits (MSB), where move (mov) instructions are in the form of 0000xxxxb (e.g., 0x0x) and logic instructions are in the form of 0001xxxxb (e.g., 0x01). A flow control instruction group 744 (e.g., call, jump (jmp), etc.,) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
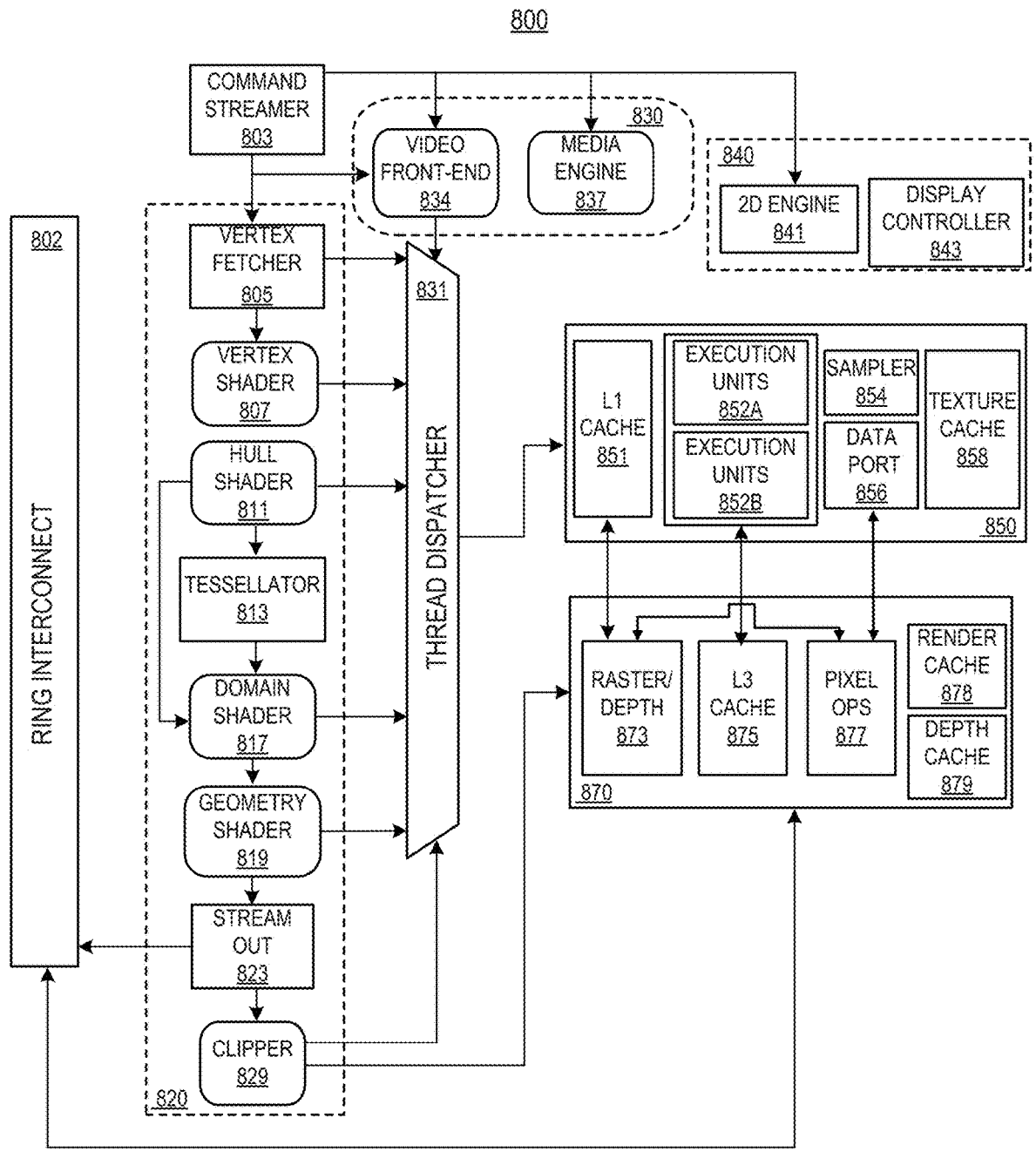
FIG. 8 is a block diagram of another embodiment of a graphics processor which includes graphics pipeline, media pipeline, display engine, thread execution logic, and render output pipeline.

FIG. 8 is a block diagram 800 of another embodiment of a graphics processor which includes graphics pipeline 820, media pipeline 830, display engine 840, thread execution logic 850, and render output pipeline 870. It is pointed out that those elements of FIG. 8 having the same reference numbers (or names) as the elements of any other figure can operate or function in any manner similar to that described, but are not limited to such.

In some embodiments, the graphics processor is a graphics processor within a multi-core processing system that includes one or more general purpose processing cores. The graphics processor is controlled by register writes to one or more control registers (not shown) or via commands issued to the graphics processor via ring interconnect 802. In some embodiments, ring interconnect 802 couples the graphics processor to other processing components, such as other graphics processors or general-purpose processors. Commands from ring interconnect 802 are interpreted by command streamer 803 which supplies instructions to individual components of graphics pipeline 820 or media pipeline 830.

In some embodiments, command streamer 803 directs the operation of a vertex fetcher 805 component that reads vertex data from memory and executes vertex-processing commands provided by command streamer 803. In some embodiments, vertex fetcher 805 provides vertex data to vertex shader 807, which performs coordinate space transformation and lighting operations to each vertex. In some embodiments, vertex fetcher 805 and vertex shader 807 execute vertex-processing instructions by dispatching execution threads to execution units 852A, 852B via thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. In some embodiments, if tessellation is not used, the tessellation components 811, 813, and 817 can be bypassed.

In embodiments, the complete geometric objects can be processed by geometry shader 819 via one or more threads dispatched to execution units 852A, 852B, or can proceed directly to clipper 829. In some embodiments, geometry shader 819 operates on the entire geometric objects, rather than the vertices or patches of vertices as in the previous stages of the graphics pipeline. If the tessellation is disabled, geometry shader 819 receives input from vertex shader 807. In some embodiments, geometry shader 819 is programmable by a geometry shader program to perform geometry tessellation if the tessellation units are disabled.

Prior to rasterization, vertex data is processed by clipper 829, which is either a fixed function clipper or a programmable clipper having clipping and geometry shader functions. In some embodiments, rasterizer 873 in render output pipeline 870 dispatches pixel shaders to convert the geometric objects into their per pixel representations. In some embodiments, pixel shader logic is included in thread execution logic 850.

The graphics engine has an interconnect bus, interconnect fabric, or some other interconnect mechanism that allows data and message passing amongst the major components of the graphics engine. In some embodiments, execution units 852A, 852B and associated cache(s) 851, texture and media sampler 854, and texture/sampler cache 858 interconnect via data port 856 to perform memory access and communicate with render output pipeline components of the graphics engine. In some embodiments, sampler 854, caches 851, 858, and execution units 852A, 852B each have separate memory access paths.

In some embodiments, render output pipeline 870 contains a rasterizer and depth test component 873 that converts vertex-based objects into their associated pixel-based representation. In some embodiments, the rasterizer logic includes a windower/masker unit to perform fixed function triangle and line rasterization. Associated render and depth buffer caches 878, 879 are also available in one embodiment. In some embodiments, pixel operations component 877 performs pixel-based operations on the data, though in some instances, pixel operations associated with 2D operations (e.g. bit block image transfers with blending) are performed by 2D engine 841 within display engine 840, or substituted at display time by display controller 843 using overlay display planes. In some embodiments, a shared L3 cache 875 is available to all graphics components, allowing the sharing of data without the use of main system memory.

In some embodiments, graphics processor media pipeline 830 includes media engine 837 and video front end 834. In some embodiments, video front end 834 receives pipeline commands from command streamer 803. In some embodiments, media pipeline 830 includes a separate command streamer. In some embodiments, video front-end 834 processes media commands before sending the command to media engine 837. In some embodiments, the media engine includes thread spawning functionality to spawn threads for dispatch to thread execution logic 850 via thread dispatcher 831.

In some embodiments, the graphics engine includes display engine 840. In some embodiments, display engine 840 is external to the graphics processor and couples with the graphics processor via ring interconnect 802, or some other interconnect bus or fabric. In some embodiments, display engine 840 includes 2D engine 841 and display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates the API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft® Corporation®, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 9A:
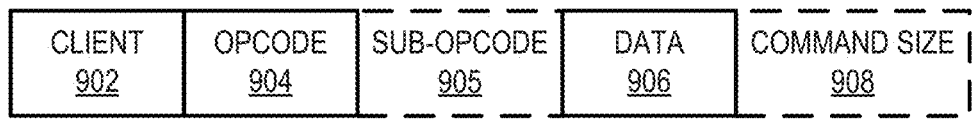
FIG. 9A illustrates a block diagram illustrating a graphics processor command format, according to some embodiments.
Figure 9B:
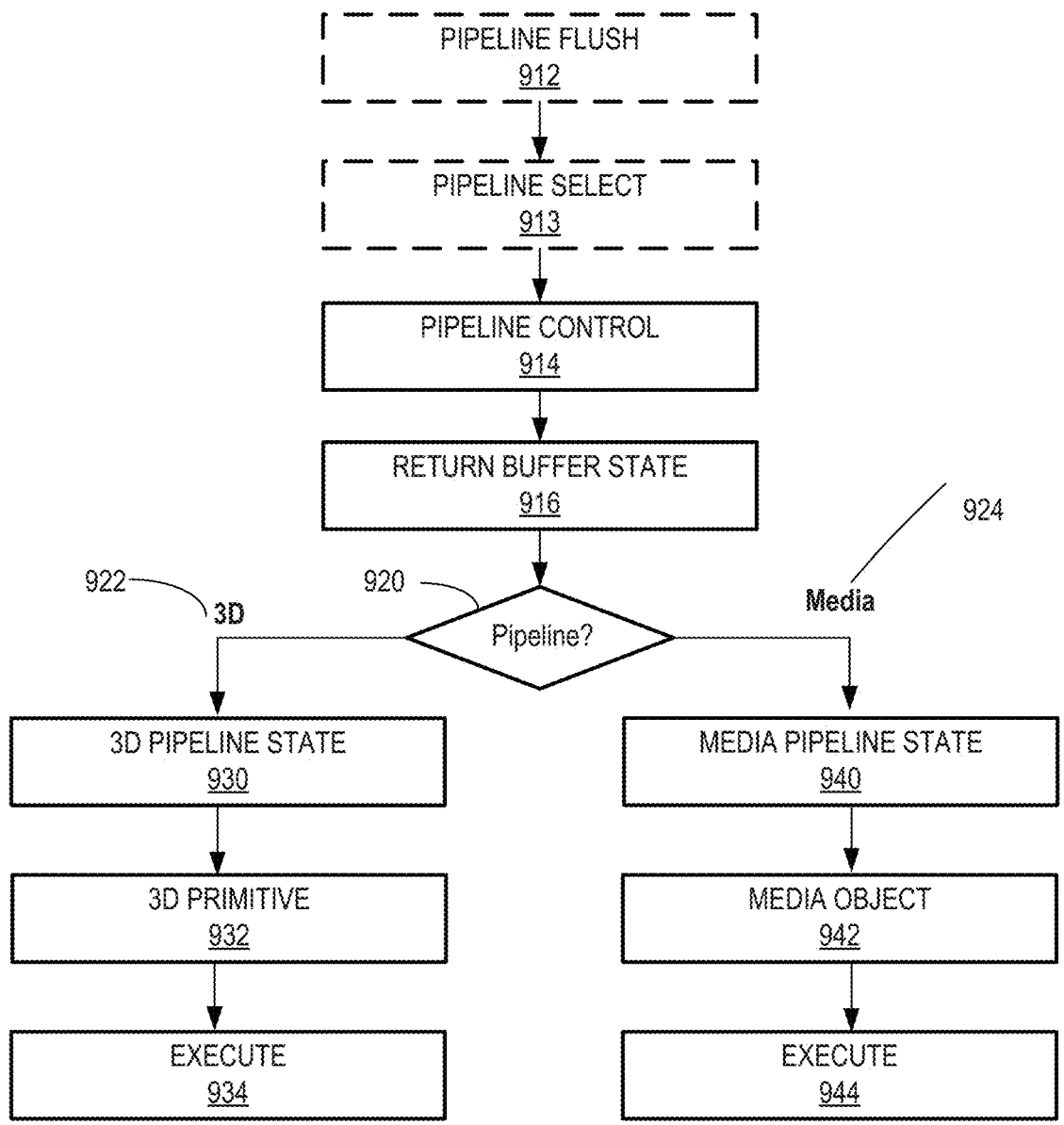
FIG. 9B illustrates a block diagram of a graphics processor command sequence, according to some embodiments of the disclosure.

FIG. 9A illustrates a block diagram illustrating a graphics processor command format 900, according to some embodiments, and FIG. 9B illustrates a block diagram of a graphics processor command sequence 910 according to some embodiments of the disclosure. It is pointed out that those elements of FIGS. 9A-B having the same reference numbers (or names) as the elements of any other figure can operate or function in any manner similar to that described, but are not limited to such.

The solid lined boxes in FIG. 9A illustrate the components that are generally included in a graphics command while the dashed lines include components that are optional or that are only included in a sub-set of the graphics commands. The example graphics processor command format 900 of FIG. 9A includes data fields to identify target client 902 of the command, command operation code (opcode) 904, and relevant data 906 for the command In some embodiments, sub-opcode 905 and command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands Once the command is received by the client unit, the client unit reads opcode 904 and, if present, sub-opcode 905 to determine the operation to perform. The client unit performs the command using information in data 906 field of the command. For some commands, an explicit command size 908 is expected to specify the size of the command In some embodiments, the command parser automatically determines the size of at least some of the commands based on the command opcode. In some embodiments, commands are aligned via multiples of a double word.

The flow chart in FIG. 9B shows a sample command sequence 910 in some embodiments. Although the blocks in sample command sequence 910 are shown in a particular order, the order of the actions can be modified. Thus, the illustrated embodiments can be performed in a different order, and some actions/blocks may be performed in parallel. Some of the blocks and/or operations listed are optional in accordance with certain embodiments. The numbering of the blocks presented is for the sake of clarity and is not intended to prescribe an order of operations in which the various blocks must occur. Additionally, operations from the various flows may be utilized in a variety of combinations.

In some embodiments, software or firmware of a data processing system that features an embodiment of the graphics processor uses a version of the command sequence shown to set up, execute, and terminate a set of graphics operations. A sample command sequence is shown and described for illustrative purposes, however embodiments are not limited to these commands or to this command sequence. Moreover, the commands may be issued as a batch of commands in a command sequence, such that the graphics processor will process the sequence of commands in an at least partially concurrent manner.

In some embodiments, sample command sequence 910 may begin with pipeline flush command 912 to cause any active graphics pipeline to complete the currently pending commands for the pipeline. In some embodiments, 3D pipeline 922 and media pipeline 924 do not operate concurrently. The pipeline flush is performed to cause the active graphics pipeline to complete any pending commands In some embodiments, in response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, pipeline select command 913 is used when a command sequence requires the graphics processor to explicitly switch between pipelines. In some embodiments, pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, pipeline control command 914 configures a graphics pipeline for operation and is used to program 3D pipeline 922 and media pipeline 924. In some embodiments, pipeline control command 914 configures the pipeline state for the active pipeline. In some embodiments, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. In some embodiments, return buffer state 916 includes selecting the size and number of return buffers to use for a set of pipeline operations.

The remaining commands in the command sequence differ based on the active pipeline for operations. Based on pipeline determination 920, the command sequence is tailored to 3D pipeline 922 beginning with 3D pipeline state 930, or media pipeline 924 beginning at media pipeline state 940.

The commands for 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via 3D primitive 932 command are forwarded to the vertex fetch function in the graphics pipeline. The vertex fetch function uses 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via execute 934 command or event. In some embodiments, a register write triggers command execution. In some embodiments, execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, sample command sequence 910 follows media pipeline 924 path when performing media operations. In general, the specific use and manner of programming for media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In some embodiments, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner to 3D pipeline 922. A set of media pipeline state commands 940 are dispatched or placed into a command queue before media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing media object command 942. Once the pipeline state is configured and media object commands 942 are queued, media pipeline 924 is triggered via execute 934 command or an equivalent execute event (e.g., register write). Output from media pipeline 924 may then be post processed by operations provided by 3D pipeline 922 or media pipeline 924. In some embodiments, GPGPU operations are configured and executed in a similar manner to media operations.

Figure 10:
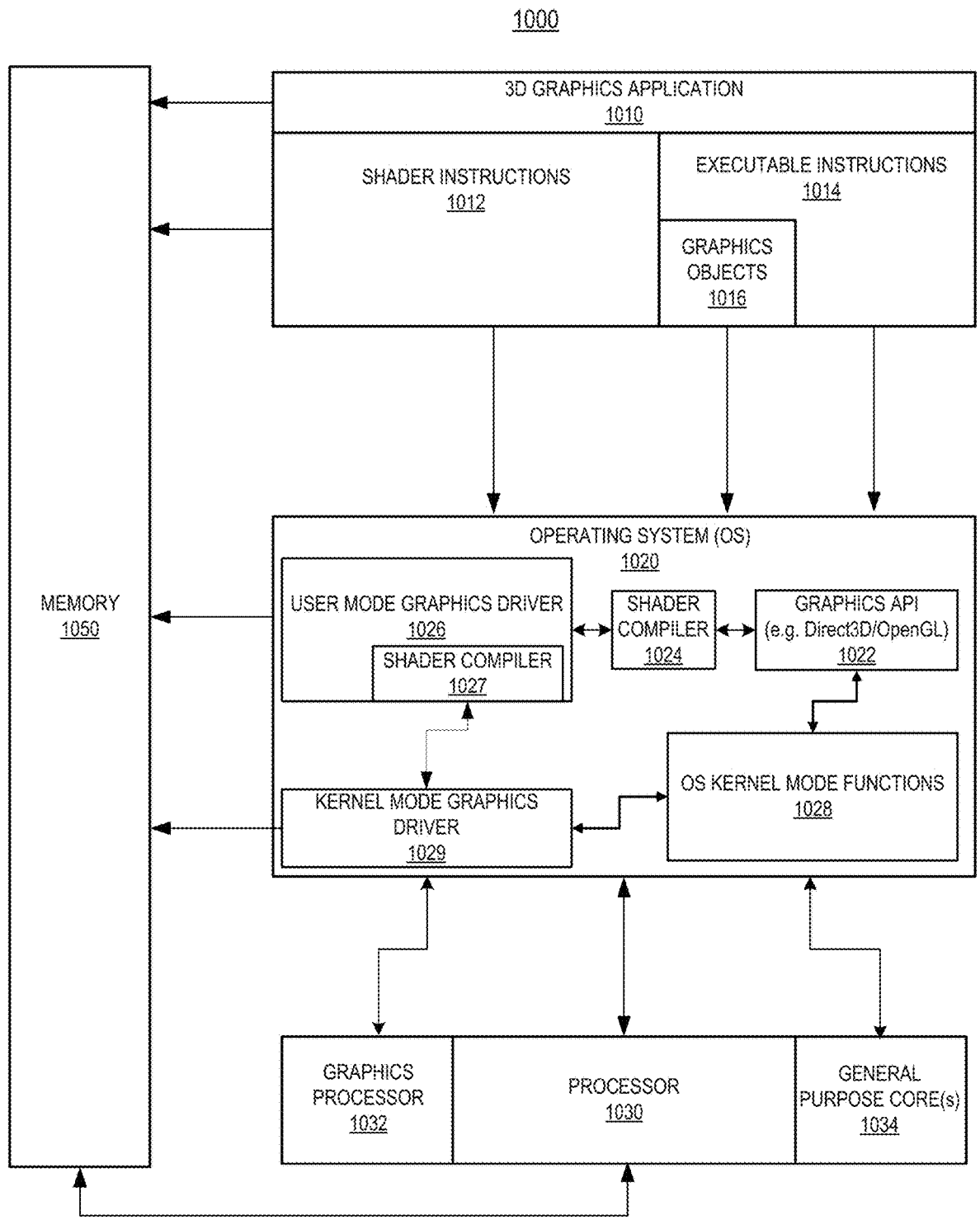
FIG. 10 illustrates a graphics software architecture for a data processing system according to some embodiments of the disclosure.

FIG. 10 illustrates a graphics software architecture 1000 for a data processing system according to some embodiments of the disclosure. It is pointed out that those elements of FIG. 10 having the same reference numbers (or names) as the elements of any other figure can operate or function in any manner similar to that described, but are not limited to such.

In some embodiments, software architecture includes 3D graphics application 1010, operating system 1020, and at least one processor 1030. In some embodiments, processor 1030 includes graphics processor 1032 and one or more general-purpose processor core(s) 1034. In some embodiments, graphics application 1010 and operating system 1020 each execute in system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core(s) 1034. The application also includes graphics objects 1016 defined by vertex data.

In some embodiments, operating system 1020 may be a Microsoft® Windows® operating system from the Microsoft Corporation, a proprietary UNIX®-like operating system, or an open source UNIX®-like operating system using a variant of the Linux® kernel. When the Direct3D API is in use, operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of 3D graphics application 1010.

In some embodiments, user mode graphics driver 1026 may contain a back-end shader compiler 1027 to convert shader instructions 1012 into a hardware specific representation. When the OpenGL API is in use, shader instructions 1012 in the GLSL high-level language are passed to user mode graphics driver 1026 for compilation. In some embodiments, user mode graphics driver 1026 uses operating system kernel mode functions 1028 to communicate with kernel mode graphics driver 1029. In some embodiments, kernel mode graphics driver 1029 communicates with graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any medium that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can perform the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the disclosure should be measured solely by reference to the claims that follow.

Figure 11:
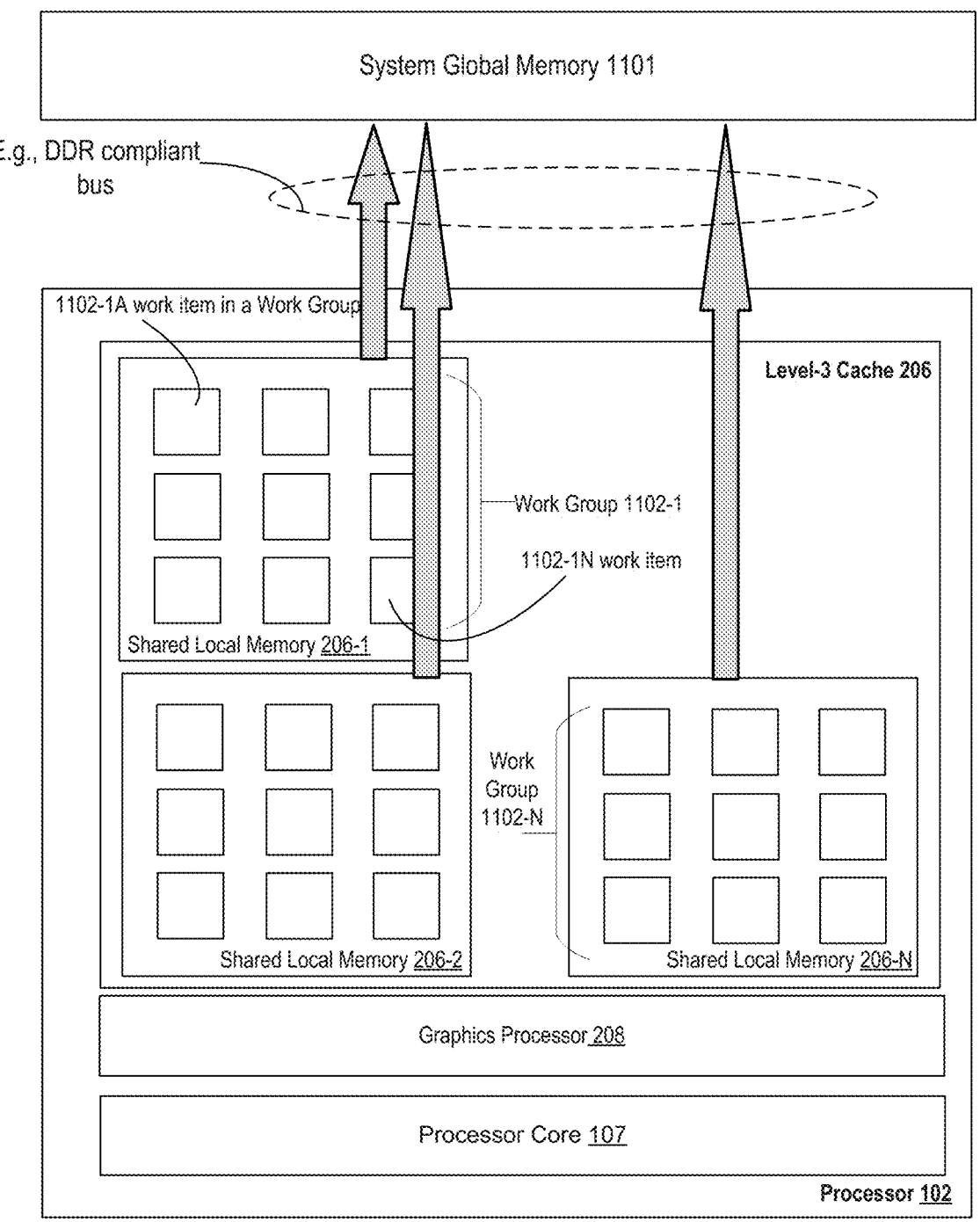
FIG. 11 illustrates architecture of a traditional OpenCL work group and memory structure.

FIG. 11 illustrates architecture 1100 of a traditional OpenCL workgroup and memory structure. Architecture 1100 is a simplified architecture showing System Global Memory (SGM) 1101 and Shared Local Memories 206-1 through 206-N. SGM 1101 may be a memory managed by a general processing unit. Here, each Shared Local Memory 206-1 through 206-N is associated with a single workgroup having one or more work items.

In traditional OpenCL memory structure, workgroups share a respective Shared Local Memory (SLM). Workgroups consist of a defined number of work items. These work items are executed by execution units. Memory space within a workgroup is a SLM. Architecture 1100 illustrates 'N' workgroups (e.g., workgroup 1102-1 through 1102-N) and corresponding 'N' SLMs (e.g., SLM 206-1 through 206-N), respectively.

In architecture 1100, computing result by each work item (e.g., 1102-1A through 1102-1N) is gathered and stored in SLM (e.g., 206-1), and then one or more work items in the workgroup (e.g., 1102-1) is responsible to write the data from SLM (e.g., 206-1) to System Global Memory (SGM) 1101 via a bus (e.g., a Double Data Rate (DDR) compliant bus as defined by Joint Electron Device Engineering Council (JEDEC) Solid State Technology Association). Since there are many atomic operations, writing from SLM (e.g., 206-1) to SGM 1101 may take long. Especially, when there is a multiple-processor or multiple devices, performance penalty of atomic operation is worse.

Figure 12:
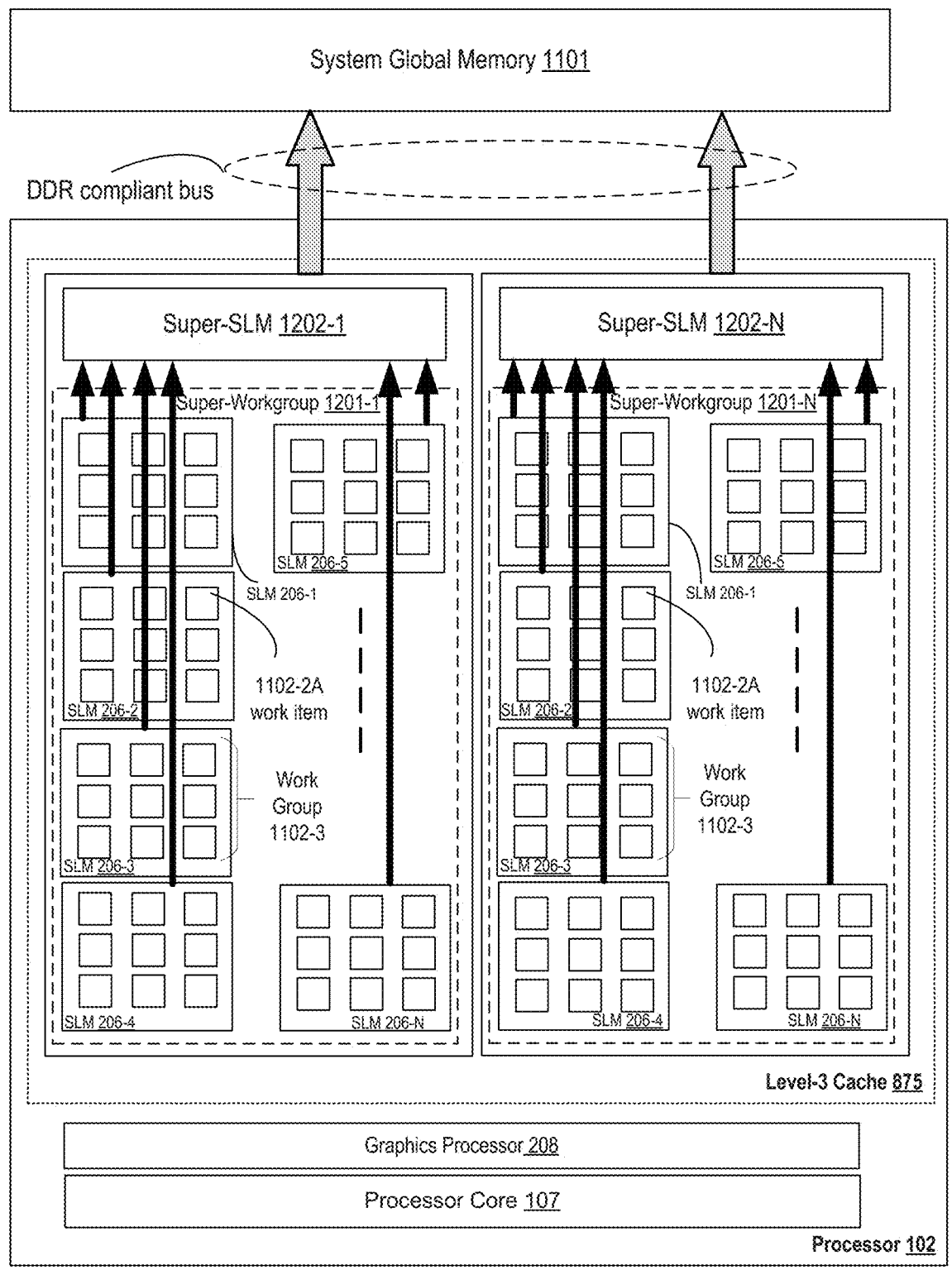
FIG. 12 illustrates architecture showing Super-Workgroup, workgroup and memory structure, according to some embodiments of the disclosure.

FIG. 12 illustrates architecture 1200 showing Super-Workgroup, workgroup and memory structure, according to some embodiments of the disclosure. It is pointed out that those elements of FIG. 12 having the same reference numbers (or names) as the elements of any other figure can operate or function in any manner similar to that described, but are not limited to such.

Compared with traditional architecture 1100 of FIG. 11, architecture 1200 defines one or more Super-workgroups, and one or more Super shared local memories (Super-SLMs). Here, Super-SLMs are indicated by 1202-1 through 1201-N, where 'N' is an integer. In some embodiments, Super-SLMs are a portion of memory (e.g., Level-3 Cache 875). In other embodiments, Super-SLMs may be a separate memory. Here, 'N' Super-workgroups are illustrated (i.e., Super-workgroup 1201-1 through 1201-N). Traditional workgroups execute in parallel or separately. In some embodiments, Super-groups 1201-1 through 1201-N execute in parallel or separately too. In some embodiments, Super-SLMs are a memory space which can be shared by different workgroups in the same sub-slice.

In some embodiments, cache memory 875 has a portion characterized as SLM (e.g., SLM 206-1) which is shared with a plurality of EUs (e.g., EU array 414/EUs 608). At least one of the EUs operates on a workgroup of sub-slice. The term "sub-slice" here generally refers to the smallest functional building block of a graphics processing unit (GPU), containing EUs (e.g., shaders) along with caches and texture/data/media samplers. In one example, each EU in a turn is composed of two Single Instruction Multiple Data (SIMD) 4-wide vectors. A single slice may contain two sub-slices with 10 EUs per sub-slice, for example. In another example, a single slice contains three sub-slices with 8 EUs per sub-slice.

Here, SLM (e.g., 206-1) is shared within workgroup 1201-1. In some embodiments, Super-SLM is logically separate from traditional SLM, but can be physically part of the same cache. For example, Cache 875 is partitioned into separate Super-SLMs and SLMs. In some embodiments, Super-SLM may be a separate memory different and/or separate from Cache 875. In some embodiments, Super-SLM is a First-in-First-out (FIFO) buffer.

Unlike a traditional workgroup which consists of a defined number of work items, a Super-workgroup (e.g., 1201-1) comprises a dynamic number of workgroups, according to some embodiments. Here, the term "dynamic number" generally refers to a number which is not a fixed number. For example, a developer can set a fixed number of work items in a workgroup during implementation. Once the number of work items is set, each workgroup contains the same number of work items. In some embodiments, the number of workgroups in a super-workgroup may not be set manually. For example, the number of workgroups may be determined by a number of workgroup in a sub-slice. In some embodiments, the number of workgroups in each super-workgroups may be different. In some embodiments, the number of workgroups in each super-workgroup is the same.

In some embodiments, a Super-SLM can be shared by different workgroups within one Super-Workgroup.

For example, an SLM can be shared by a workgroup, and the workgroup may be part of Super-workgroups, according to some embodiments. In some embodiments, after each workgroup in the Super-workgroup completes its operation, that workgroup writes its data to its Super-SLM. For example, when workgroup 1102-3 completes its tasks (i.e., its work items complete their assigned tasks) then it writes its data to Super-SLM 1202-1 (as shown by a solid thick arrow).

Since the Super-Workgroup has a dynamic number of workgroups, data is written to SGM 1101 when a last workgroup is determined/generated as described with reference to FIG. 13. Referring back to FIG. 12, for example, when the last workgroup in Super-workgroup 1201-1 is created, Super-SLM 1202-1 writes its content to SGM 1101. This saves a number of transactions on the interface between Processor 102 and SGM 1101 because every SLM is not writing to SGM 1101.

For example, by defining Super-SLMs, more than 10× improvement in performance is observed for architecture 1100. Here, the term "improvement" generally refers to how fast write operation is performed from L3-cache to L3-cache compared to writing from L3-cache (e.g., 206/875) to SGM 1101.

Figure 13:
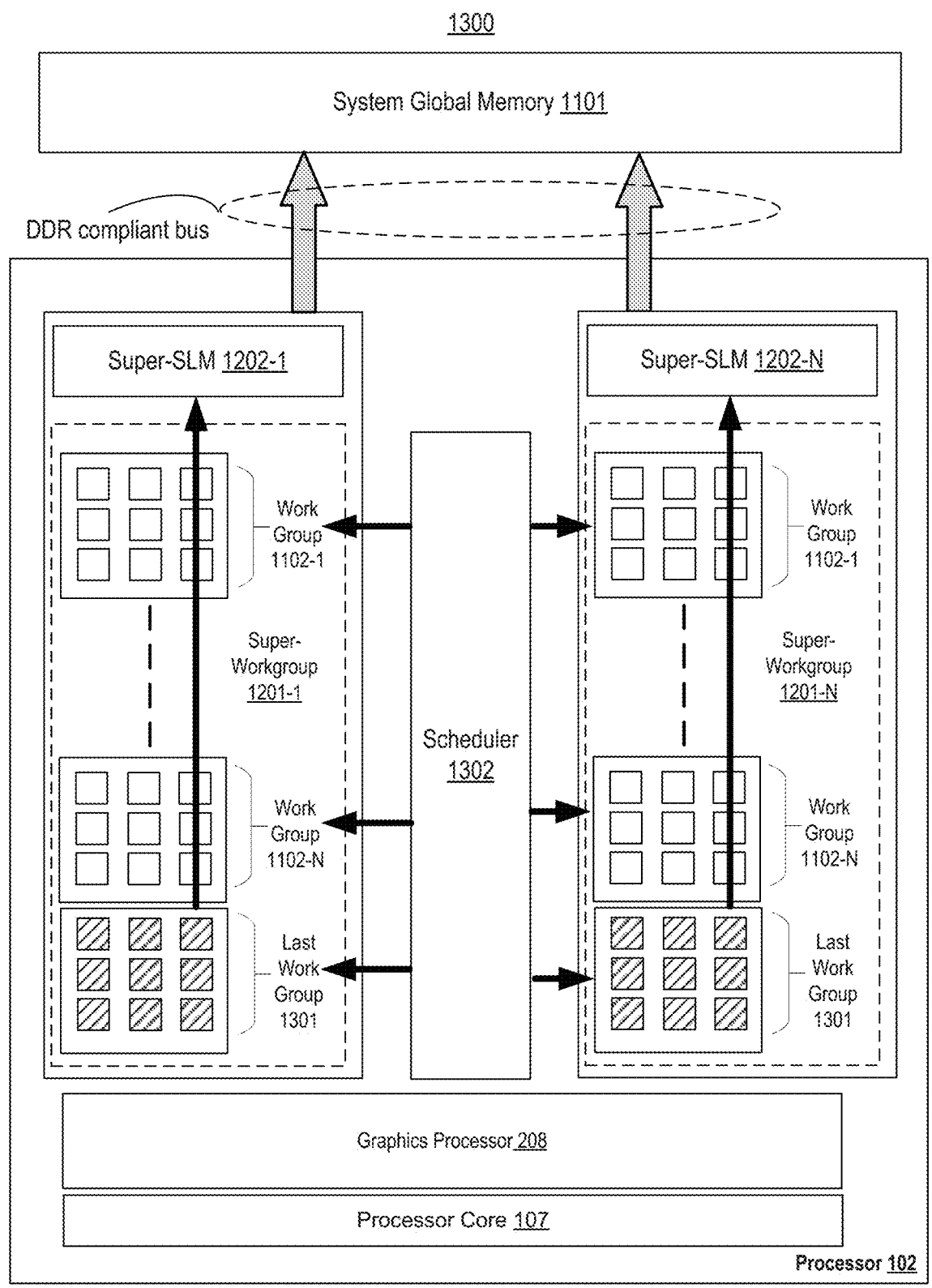
FIG. 13 illustrates architecture showing how Super-Workgroup writes back data to System Global Memory (SGM), according to some embodiments of the disclosure.

FIG. 13 illustrates architecture 1300 showing how a Super-Workgroup writes back data to SGM 1101, according to some embodiments of the disclosure.

It is pointed out that those elements of FIG. 13 having the same reference numbers (or names) as the elements of any other figure can operate or function in any manner similar to that described, but are not limited to such.

In some embodiments, a new workgroup 1301 (also referred to here as the last workgroup) is generated in a super-workgroup (e.g., 1201-1) by Scheduler 1302 once all the workgroups in that super-workgroup finish their calculation(s). In some embodiments, Scheduler 1302 generates a new thread (which is referred to as a workgroup in OpenCL) in a Super-workgroup which is the last workgroup in that Super-workgroup. In some embodiments, Scheduler 1302 is a component in graphics processor(s) 108. In some embodiments, when Scheduler 1302 determines that each workgroup has completed its calculation operation, Scheduler 1302 creates a new workgroup/thread to write the data from Super-SLM 1202-1 to SGM 1101. In some embodiments, last workgroup 1301 is responsible to write data back to the SGM 1101 from Super-SLM 1202-1.

Figure 14:
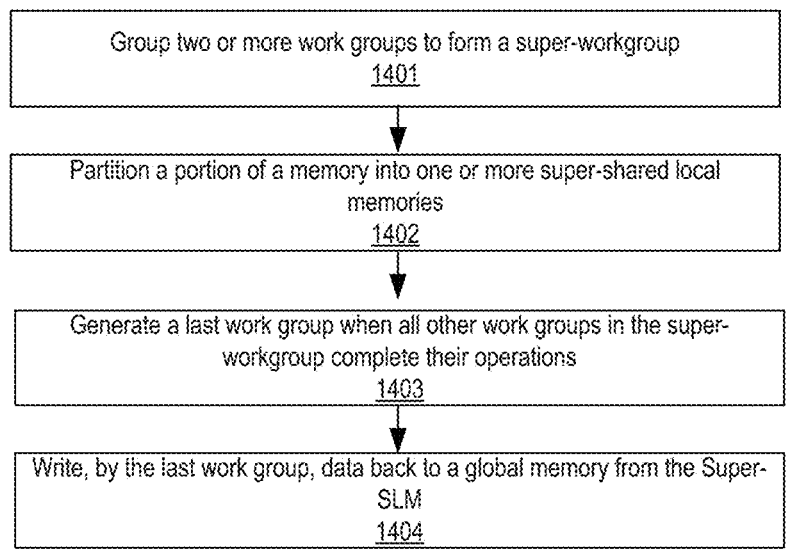
FIG. 14 is flowchart of a method for improving memory access performance between Shared Local Memory (SLM) and SGM, according to some embodiments of the disclosure.

FIG. 14 is flowchart 1400 of a method for improving memory access performance between SLM and SGM 1101, according to some embodiments of the disclosure.

It is pointed out that those elements of FIG. 14 having the same reference numbers (or names) as the elements of any other figure can operate or function in any manner similar to that described, but are not limited to such.

Although the blocks in flowchart 1400 with reference to FIG. 14 are shown in a particular order, the order of the actions can be modified. Thus, the illustrated embodiments can be performed in a different order, and some actions/blocks may be performed in parallel. Some of the blocks and/or operations listed in FIG. 14 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 1401, two or more workgroups are grouped together to form a super-workgroup. In some embodiments, at least one workgroup (e.g., 1102-1) includes a plurality of work items (e.g., 1102-1A through 1102-1N). Each work item is responsible for one calculation/operation action, according to some embodiments. For example, one of the work items may execute a summation instruction to sum numbers.

At block 1402, a portion of a memory (e.g., Level-3 Cache 875 in FIG. 12) is partitioned (physically or logically) into one or more Super-SLM memories e.g., Super SLM 1202-1 through 1202-N, where 'N' is an integer.

The memory space shared within the super-workgroup (e.g., 1201-1) forms at least one Super-SLM (e.g., 1202-1)

of the one or more Super-SLMs. In some embodiments, the memory space within a workgroup from among the two or more workgroups is a SLM.

For example, SLM 206-1 is shared memory in Level-3 Cache 875, and SLM 206-1 includes a plurality of work items (e.g., 1102-1A) in workgroup 1102-1.

In some embodiments, SLM is separate from Super-SLM. In some embodiments, SLM is a subset of the Super-SLM as shown with reference to FIG. 12 and FIG. 13.

Referring back to FIG. 14, in some embodiments, data is written to global memory (e.g., SGM 1101) by the super-workgroup (e.g., 1102-1A) after a last workgroup in a sub-slice is created. As such, at block 1403, a last workgroup (e.g., 1301) in a sub-slice is created for the super-workgroup (e.g., 1201-1) when all other workgroups in the super-workgroup complete their respective operations. For example, when all workgroups 1102-1 through 1102-N in super-workgroup 1201-1 complete their tasks, last workgroup 1301 is generated by Scheduler 1302. At block 1404, in some embodiments, work items in last workgroup 1301 write data from Super-SLM to SGM 1101.

For example, last workgroup 1301 writes data to SGM 1101 from Super-SLM 1202-1. With this framework of FIG. 14, data is written from super-SLM (e.g., 1202-1 through 1202-N) to SGM 1101 versus traditionally being written from SLM to global memory. As such, memory writing operations from Level-3 cache 875 to SGM 1101 are reduced and the overall computing efficiency improves, according to some embodiments. Described below is a pseudo code for generating a sum value of each element which needs to get the number of each item and then sum them.

---

For each Super-workgroup,
Do
{
    For each workgroup in the same sub-slice
    {
        Get the number of each item and add the number to the number stored in the Super-SLM
    }
} while all the workgroups are done
Create a new thread in the same sub-slice;

---

The new thread will add the number from Super-SLM to the number in SGM 1101, where the number in SGM 1101 will be one of the elements in the histogram.

With the new architecture 1200/1300, the memory operation efficiency can be improved significantly over traditional architecture 1100. The following example shows the improvement in memory operation efficiency.

Assume there are 'M' computing devices and each one has T sub-slices, and there is a working task with 'N' workgroups working on them. Assume further that the time to write data from L3 cache 875 to SGM 1101 is Tg, and the time to write data from L4 cache to L3 cache is Tc, then with the traditional architecture of FIG. 11, the memory writing operation from cache (i.e., SLM 206-1) to SGM 1101 will take 'N' times. This means the total time is N*Tg.

With the new architecture of FIGS. 12-13, there will be 'N' times writing within local cache (e.g., Super-SLM 1202) and M*J times writing from cache (e.g., Super-SLM 1202) to SGM 1101. With the new architecture of FIGS. 12/13, the total time is (N*Tc+M*J*Tg), and so the overall performance improvement is: (N*Tg)−(N*Tc+M*J*Tg)=(N−M*J)*Tg−N*Tc, according to one example.

Since M*J is very small (e.g., for M=1 and J=2, M*J=2), 'N' is much bigger in most cases (e.g., a few hundreds), (N−M*J)*Tg is close to N*Tg while Tg is much longer than Tc. With the new architecture of FIGS. 12/13, it takes much less time to write all the data back to SGM 1101 (e.g., around N*(Tg−Tc) timing is saved) from L3 cache 875 than using the traditional architecture of FIG. 11.

While the embodiments of Super-SLM are described with reference to graphics processing, the concepts can be used for any memory subsystem. For example, the embodiments can be used to reduce number of write operations between processor cache and a global system memory by generating a Super-SLM in a processor cache or another memory.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to that fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, a machine readable storage medium is provided having instructions stored thereon, that when executed, cause a processor to perform a method which comprises: grouping two or more work groups to form a super-workgroup; and partitioning a portion of a memory space into one or more super-shared local memories (Super-SLMs), wherein the memory space shared within the super-workgroup forms at least one Super-SLM of the one or more Super-SLMs.

In some embodiments, the machine readable storage medium has further instructions that when executed cause the processor to perform a further method which comprises: writing data to a global memory by the super-workgroup. In some embodiments, at least one work group includes a plurality of work items. In some embodiments, the memory space within a work group from among the two or more work groups is a shared local memory (SLM). In some embodiments, the SLM is separate from the super-SLM. In some embodiments, the SLM is a subset of the super-SLM.

In some embodiments, the machine readable storage medium is provided having further instructions that when executed cause the processor to perform a further method which comprises: determining, for the super-workgroup, a last work group in a sub-slice. In some embodiments, the machine readable storage medium has further instructions that when executed cause the processor to perform a further method which comprises: generating the last work group when all other work groups in the super-workgroup complete their operations. In some embodiments, the machine readable storage medium has further instructions that when executed cause the processor to perform a further method which comprises: writing, by the last work group, data back to a global memory from the Super-SLM. In some embodiments, the portion of the memory is at least one of: a cache; a first-in-first-out (FIFO); or a logical partitioned memory. In some embodiments, the cache is a Level-3 cache.

In another example, an apparatus is provided which comprises: a plurality of execution units; a cache memory having a portion considered as a SLM which is shared with the plurality of execution units, at least one of which is to operate on a work group of a sub-slice, wherein the SLM is shared within the work group; and at least one Super-SLM for providing shared memory accessible by different work groups in the sub-slice, wherein the at least one of the execution units operates on the different work groups.

In some embodiments, the different work groups are grouped to form a super-workgroup. In some embodiments, the shared memory is accessible by the super-workgroup which forms the at least one Super-SLM of one or more Super-SLMs. In some embodiments, the super-workgroup in the Super-SLM writes data to a global memory. In some embodiments, the apparatus comprises a scheduler for determining, for the super-workgroup, a last work group in a sub-slice.

In some embodiments, the scheduler is operable to service the last work group when all other work groups in the super-workgroup complete their operations. In some embodiments, the last work group writes data back to a global memory from the Super-SLM. In some embodiments, the Super-SLM is a super set of the SLM. In some embodiments, the Super-SLM is at least one of: a cache; a FIFO; or a logical partitioned memory. In some embodiments, the cache is a level-4 cache.

In another example, a system is provided which comprises a memory; a graphics processor coupled to the memory via an input/output (I/O) interface, the graphics processor including: a plurality of execution units; a cache memory having a portion considered as a SLM which is shared with the plurality of execution units at least one of which is to operate on a work group of a sub-slice, wherein the SLM is shared within the work group; and at least one Super-SLM for providing shared memory accessible by different work groups in the sub-slice, wherein the at least one of the execution units operates on the different work groups; and a wireless interface for allowing the graphics processor to communicate with another device.

In some embodiments, the I/O interface is a Double Data Rate (DDR) compliant interface. In some embodiments, the memory is a Dynamic Random Access Memory (DRAM). In some embodiments, the different work groups are grouped to form a super-workgroup, wherein the super-workgroup in the Super-SLM writes data to the memory.

In another example, a method is provided which comprises: grouping two or more work groups to form a super-workgroup; and partitioning a portion of a memory space into one or more Super-SLMs, wherein the memory space shared within the super-workgroup forms at least one Super-SLM of the one or more Super-SLMs. In some embodiments, the method comprises: writing data to a global memory by the super-workgroup. In some embodiments, at least one work group includes a plurality of work items.

In some embodiments, the memory space within a work group from among the two or more work groups is a SLM. In some embodiments, the SLM is separate from the super-SLM. In some embodiments, the SLM is a subset of the super-SLM. In some embodiments, the method comprises generating a last work group when all other work groups in the super-workgroup complete their operations; and writing, by the last work group, data back to a global memory from the Super-SLM.

In another example, an apparatus is provided which comprises: means for grouping two or more work groups to form a super-workgroup; and means for partitioning a portion of a memory space into one or more Super-SLMs, wherein the memory space shared within the super-workgroup forms at least one Super-SLM of the one or more Super-SLMs. In some embodiments, the apparatus comprises means for writing data to a global memory by the super-workgroup. In some embodiments, the at least one work group includes a plurality of work items.

In some embodiments, the memory space within a work group from among the two or more work groups is a SLM. In some embodiments, the SLM is separate from the super-SLM. In some embodiments, the SLM is a subset of the super-SLM. In some embodiments, the apparatus comprises: means for generating a last work group when all other work groups in the super-workgroup complete their operations; and means for writing, by the last work group, data back to a global memory from the Super-SLM.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A non-transitory machine readable storage medium having instructions stored thereon, that when executed, cause a processor to perform a method comprising:

grouping two or more work groups to form a super-workgroup, wherein the number of work groups forming the super-workgroup is a dynamic number, which is not a fixed number of workgroups during operation; and partitioning a portion of a memory space into one or more super-shared local memories (Super-SLMs), wherein memory space, which is shared within the super-workgroup forms at least one Super-SLM of the one or more Super-SLMs.

2. The non-transitory machine readable storage medium of claim 1 having further instructions stored thereon that when executed cause the processor to perform the method comprising: writing data to a global memory by the super-workgroup.

3. The non-transitory machine readable storage medium of claim 1, wherein at least one work group includes a plurality of work items.

4. The non-transitory machine readable storage medium of claim 3, wherein memory space within a work group from among the two or more work groups comprises a shared local memory (SLM).

5. The non-transitory machine readable storage medium of claim 4, wherein the SLM is separate from the super-SLM.

6. The non-transitory machine readable storage medium of claim 4, wherein the SLM is a subset of the super-SLM.

7. The non-transitory machine readable storage medium of claim 1 having further instructions that when executed cause the processor to perform a further method which comprises: determining, for the super-workgroup, a last work group in a sub-slice.

8. The non-transitory machine readable storage medium of claim 7 having further instructions that when executed cause the processor to further perform a method which comprises: generating the last work group when all other work groups in the super-workgroup complete their operations.

9. The non-transitory machine readable storage medium of claim 7 having further instructions that when executed cause the processor to further perform a method which comprises: writing, by the last work group, data back to a global memory from the Super-SLM.

10. The non-transitory machine readable storage medium of claim 1, wherein the portion of the memory space is at least one of: a cache; a First-in-First-Out (FIFO); or a logical partitioned memory.

11. The non-transitory machine readable storage medium of claim 1, wherein the work groups that form the super-workgroup is generated by a scheduler.

12. The non-transitory machine readable storage medium of claim 1, wherein the dynamic number of work groups depends on a number of workgroups in a sub-slice.

13. The non-transitory machine readable storage medium of claim 1, wherein the dynamic number of work groups depends on when a last workgroup is determined or generated.

14. An apparatus comprising:
a plurality of execution units;
a cache memory having a portion which operates as a shared local memory (SLM), which is shared with the plurality of execution units, at least one of the execution units being configured to operate on a work group of a sub-slice, wherein the SLM is shared within the work group; and
at least one Super-SLM to provide shared memory accessible by a number of different work groups in the sub-slice, wherein the at least one of the execution units is configured to operate on the different work groups, wherein the different work groups are grouped to form a super-workgroup, and wherein the number of the different work groups that forms a super-work group is a dynamic number of work groups, which is not a fixed number of workgroups during operation.

15. The apparatus of claim 14, wherein the super-workgroup is configured to write data to a global memory of the apparatus.

16. The apparatus of claim 14 further comprising a scheduler to determine, for the super-workgroup, a last work group in a sub-slice.

17. The apparatus of claim 16, wherein the scheduler is operable to service the last work group when all other work groups in the super-workgroup complete their operations.

18. The apparatus of claim 16 wherein the last work group is configured to write data back to a global memory from the Super-SLM.

19. The apparatus of claim 14, wherein the Super-SLM comprises a super set of the SLM.

20. A system comprising:
an input/output (I/O) interface;
a memory;
a graphics processor coupled to the memory via the I/O interface, the graphics processor including:
  a plurality of execution units;
  a cache memory having a portion which operates as a shared local memory (SLM), which is shared with the plurality of execution units, at least one of the execution units being configured to operate on a work group of a sub-slice, wherein the SLM is shared within the work group; and
  at least one Super-SLM to provide shared memory accessible by different work groups in the sub-slice, wherein the at least one of the execution units is configured to operate on the different work groups, wherein the number of the different work groups that forms a super workgroup is a dynamic number of work groups, which is not a fixed number of workgroups during operation; and
a wireless interface to allow the graphics processor to communicate with another device.

21. The system of claim 20, wherein the I/O interface comprises a Double Data Rate (DDR) compliant interface.

* * * * *